United States Patent
Murayama et al.

(10) Patent No.: US 11,546,896 B2
(45) Date of Patent: Jan. 3, 2023

(54) USER TERMINAL AND RADIO COMMUNICATION METHOD

(71) Applicant: NTT DOCOMO, INC., Tokyo (JP)

(72) Inventors: Daisuke Murayama, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/645,406

(22) PCT Filed: Sep. 11, 2017

(86) PCT No.: PCT/JP2017/032710
§ 371 (c)(1),
(2) Date: Mar. 6, 2020

(87) PCT Pub. No.: WO2019/049379
PCT Pub. Date: Mar. 14, 2019

(65) Prior Publication Data
US 2020/0288442 A1    Sep. 10, 2020

(51) Int. Cl.
*H04W 72/04* (2009.01)
*H04W 56/00* (2009.01)

(52) U.S. Cl.
CPC ....... *H04W 72/042* (2013.01); *H04W 56/001* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2018/0338308 A1* | 11/2018 | Park | H04L 5/003 |
| 2019/0089474 A1* | 3/2019 | Ly | H04L 27/26025 |
| 2020/0119874 A1* | 4/2020 | Liu | H04L 5/0048 |
| 2020/0367183 A1* | 11/2020 | Kim | H04W 72/005 |
| 2021/0153162 A1* | 5/2021 | Chen | H04W 56/001 |

OTHER PUBLICATIONS

International Search Report issued in PCT/JP2017/032710 dated Nov. 21, 2017 (1 page).
Written Opinion of the International Searching Authority issued in PCT/JP2017/032710 dated Nov. 21, 2017 (3 pages).
LG Electronics; "RMSI delivery and CORESET configuration"; 3GPP TSG RAN WG1 Meeting #90, R1-1713125; Prague, Czech Republic; Aug. 21-25, 2017 (8 pages).

(Continued)

*Primary Examiner* — Saba Tsegaye
(74) *Attorney, Agent, or Firm* — Osha Bergman Watanabe & Burton LLP

(57) ABSTRACT

To appropriately notify information of a control channel configuration domain in a radio communication system that uses a synchronization signal block, one aspect of a user terminal according to the present invention includes: a reception section that receives a Synchronization Signal (SS) block including given bit information indicating a configuration of a control resource set; and a control section that decides contents of the given bit information according to a subcarrier-spacing and/or a frequency band applied to transmission of the SS block, and controls reception of a downlink control channel.

5 Claims, 16 Drawing Sheets

(56) References Cited

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in counterpart European Patent Application No. 17924230.0, dated Mar. 18, 2021 (7 pages).
NTT Docomo, Inc.; "Discussion and evaluation on NR-PBCH design"; 3GPP TSG RAN WG1 Meeting #89, R1-1708439; Hangzhou, P.R. China, May 15-19, 2017 (8 pages).
Office Action in counterpart Indian Patent Application No. 202037009566 dated Mar. 7, 2022 (6 pages).
Office Action issued in the counterpart Japanese Patent Application No. 2019-540739, dated Nov. 16, 2021 (6 pages).
Ericsson [RAN1]; "[Draft] Reply LS on PDCCH design"; 3GPP TSG RAN WG1 Meeting NR Ad-hoc#2, R1-1711910; Qingdao, P.R. China; Jun. 27-30, 2017 (2 pages).

* cited by examiner

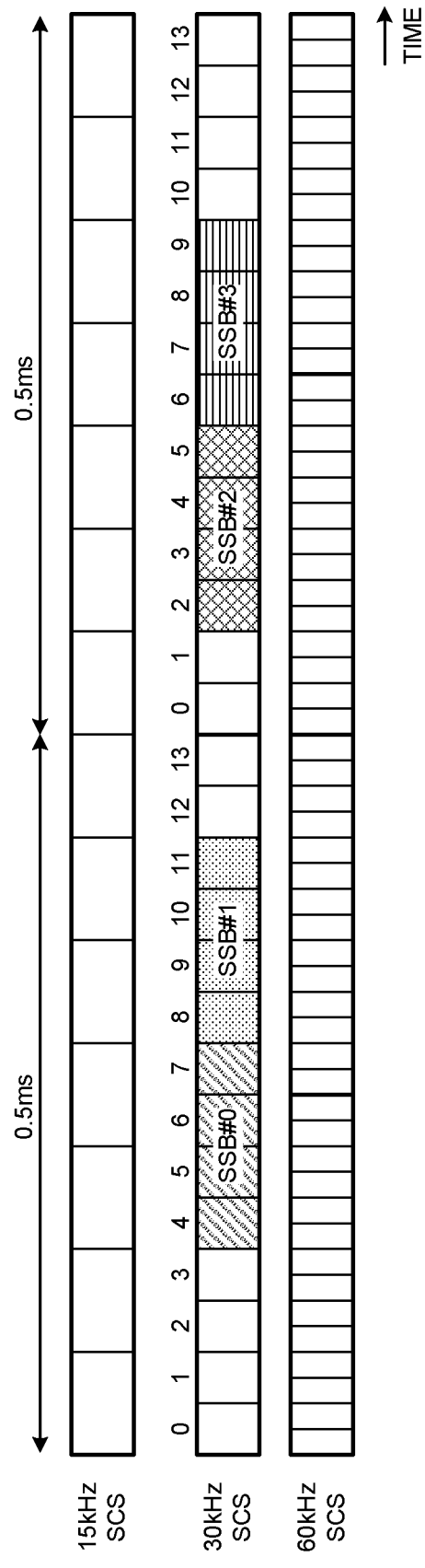
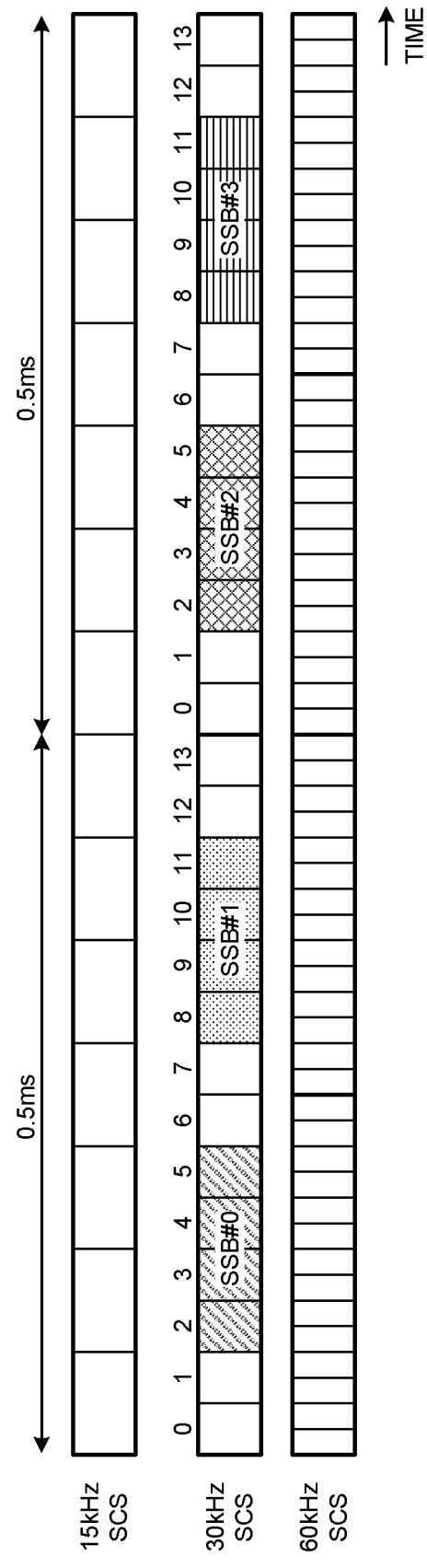

FIG. 5A

15/30/60/120kHz SCS

| # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| BIT | 0000 | 0001 | 0010 | 0011 | 0100 | 0101 | 0110 | 0111 | 1000 | 1001 | 1010 | 1011 | 1100 | 1101 | 1110 | 1111 |
| BANDWIDTH (BW) | 24PRB | | | | | | 48PRB | | | | | | 96PRB | | | NULL |
| DURATION | 2 OFDM SYMBOLS | | | 3 OFDM SYMBOLS | | | 1 OFDM SYMBOL | | | 2 OFDM SYMBOLS | | | 1 OFDM SYMBOL | | | |
| STRAT POSITION | S1 | S2 | S3 | S1 | S2 | S3 | S1 | S2 | S3 | S1 | S2 | S3 | S1 | S2 | S3 | |
| FREQUENCY POSITION | F1 | F2 | F2 | F1 | F2 | F2 | F3 | F2 | F2 | F3 | F2 | F2 | F3 | F2 | F2 | |

FIG. 5B

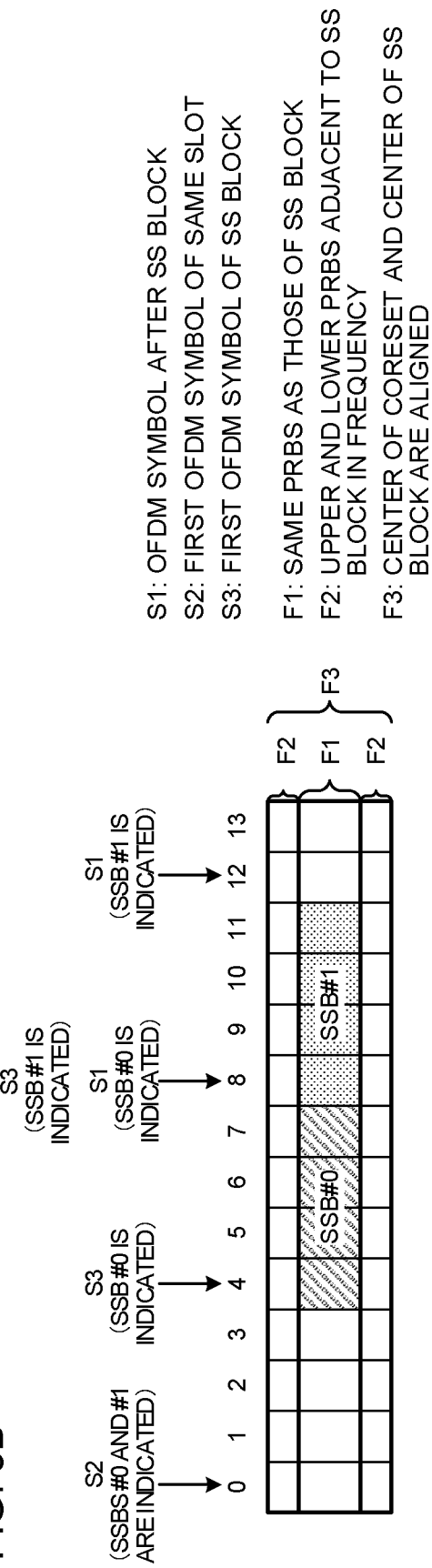

S1: OFDM SYMBOL AFTER SS BLOCK
S2: FIRST OFDM SYMBOL OF SAME SLOT
S3: FIRST OFDM SYMBOL OF SS BLOCK

F1: SAME PRBS AS THOSE OF SS BLOCK
F2: UPPER AND LOWER PRBS ADJACENT TO SS BLOCK IN FREQUENCY
F3: CENTER OF CORESET AND CENTER OF SS BLOCK ARE ALIGNED

240kHz SCS

| # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| BIT | 00000 | 00001 | 00010 | 00011 | 00100 | 00101 | 00110 | 00111 | 01000 | 01001 | 01010 | 01011 | 01100 | 01101 | 01110 | 01111 |
| BANDWIDTH (BW) | 24PRB |||||||||||| 48PRB ||||
| DURATION | 2 OFDM SYMBOLS |||||| 3 OFDM SYMBOLS |||||| 1 OFDM SYMBOL ||||
| START POSITION | S1 | S8 | S10 | S12 | S14 | S3 | S1 | S8 | S9 | S10 | S11 | S3 | S1 | S8 | S9 | S10 |
| FREQUENCY POSITION | F1 |||| F2 | | F1 |||| F2 | | F3 ||||

| # | 16 | 17 | 18 | 19 | 20 | 21 | 22 | 23 | 24 | 25 | 26 | 27 | 28 | 29 | 30 | |
|---|---|---|---|---|---|---|---|---|---|---|---|---|---|---|---|---|
| BIT | 10000 | 10001 | 10010 | 10011 | 10100 | 10101 | 10110 | 10111 | 11000 | 11001 | 11010 | 11011 | 11100 | 11101 | 11110 | |
| BANDWIDTH (BW) | 48PRB |||||||| 96PRB ||||||| NULL |
| DURATION | 1 OFDM SYMBOL | 2 OFDM SYMBOLS |||||| 1 OFDM SYMBOL ||||||| |
| START POSITION | S11 | S3 | S8 | S10 | S12 | S14 | S3 | S1 | S8 | S9 | S10 | S11 | S3 | | |
| FREQUENCY POSITION | F3 | F2 | F3 |||| F2 | | F3 |||| F2 | | |

FIG. 6

240kHz SCS

| # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| BIT | 0000 | 0001 | 0010 | 0011 | 0100 | 0101 | 0110 | 0111 | 1000 | 1001 | 1010 | 1011 | 1100 | 1101 | 1110 | 1111 |
| BANDWIDTH (BW) | 24PRB | | | | | | 48PRB | | | | | 96PRB | | | | NULL |
| DURATION | 2 OFDM SYMBOLS | | | | 3 OFDM SYMBOLS | | 1 OFDM SYMBOL | | | | 2 OFDM SYMBOLS | 1 OFDM SYMBOL | | | | |
| STRAT POSITION | S1 | S8 | S10 | S3 | S3 | S2 | S1 | S8 | S9 | S3 | S3 | S1 | S8 | S9 | S3 | |
| FREQUENCY POSITION | F1 | | | | F2 | | F3 | | | F2 | | F3 | | | F2 | |

FIG. 7

240kHz SCS

| # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| BIT | 0000 | 0001 | 0010 | 0011 | 0100 | 0101 | 0110 | 0111 | 1000 | 1001 | 1010 | 1011 | 1100 | 1101 | 1110 | 1111 |
| BANDWIDTH (BW) | 24PRB | | | | | | | | 48PRB | | | | 96PRB | | | NULL |
| DURATION | 2 OFDM SYMBOLS | | 3 OFDM SYMBOLS | | | | 1 OFDM SYMBOL | | 2 OFDM SYMBOLS | | | | 1 OFDM SYMBOL | | | |
| STRAT POSITION | S1 | SZ | S3 | S1 | SZ | S3 | S1 | SZ | S3 | S1 | SZ | S3 | S1 | SZ | S3 | |
| FREQUENCY POSITION | F1 | | F2 | | F1 | F2 | F3 | | F2 | F3 | | F2 | | F3 | F2 | |

6GHz OR MORE

| # | 0 | 1 | 2 | 3 | 4 | 5 | 6 | 7 |
|---|---|---|---|---|---|---|---|---|
| BIT | 000 | 001 | 010 | 011 | 100 | 101 | 110 | 111 |
| BANDWIDTH (BW) | 24PRB | | 48PRB | | 96PRB | | 154PRB | |
| DURATION (OFDM SYMBOL) | 2 | 3 | 1 | 2 | 1 | 2 | 1 | 2 |

FIG. 9B

6 GHz OR MORE

| # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| BIT | 0000 | 0001 | 0010 | 0011 | 0100 | 0101 | 0110 | 0111 | 1000 | 1001 | 1010 | 1011 | 1100 | 1101 | 1110 | 1111 |
| STRAT POSITION | SB14 | SB12 | SB10 | SB8 | SB6 | SB4 | SB2 | ST1 | ST3 | SN1 | SA3 | SA5 | SA7 | SA9 | SA11 | SA13 |

6 GHz OR MORE

| # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| BIT | 00000 | 00001 | 00010 | 00011 | 00100 | 00101 | 00110 | 00111 | 01000 | 01001 | 01010 | 01011 | 01100 | 01101 | 01110 | 01111 |
| FREQUENCY POSITION (BW CENTER) | F | F+12 | F+24 | F+36 | F+48 | F+60 | F+72 | F+84 | F+96 | F+108 | F+120 | F+132 | F+144 | F+156 | F+168 | F+180 |

| 16 | 17 | 18 | 19 | 20 | 21 | 22 | 23 | 24 | 25 | 26 | 27 | 28 | 29 | 30 | 30 |
|---|---|---|---|---|---|---|---|---|---|---|---|---|---|---|---|
| 10000 | 10001 | 10010 | 10011 | 10100 | 10101 | 10110 | 10111 | 11000 | 11001 | 11010 | 11011 | 11100 | 11101 | 11110 | 11111 |
| F-12 | F-24 | F-36 | F-48 | F-60 | F-72 | F-84 | F-96 | F-108 | F-120 | F-132 | F-144 | F-156 | F-168 | F-180 | NULL |

FIG. 10

USER TERMINAL AND RADIO COMMUNICATION METHOD

CROSS-REFERENCE TO RELATED APPLICATION

This application is a national phase application of PCT/JP2017/032710, filed on Sep. 11, 2017. The contents of the priority application are hereby incorporated by reference in their entirety.

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for a larger capacity and higher sophistication than those of LTE (LTE Rel. 8 and 9), LTE-Advanced (LTE-A or LTE Rel. 10, 11, 12 and 13) has been specified.

LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 14, 15 or subsequent releases) have been also studied.

In legacy LTE systems (e.g., LTE Rel. 8 to 13), a user terminal (UE: User Equipment) detects synchronization signals (a Primary Synchronization Signal (PSS) and/or a Secondary Synchronization Signal (SSS)) by an initial access procedure (also referred to as, for example, cell search), synchronizes with a network (e.g., a base station (eNB: eNode B)), and identifies a cell (i.e., identifies the cell based on, for example, a cell Identifier (ID)) to connect with.

Furthermore, after cell search, the user terminal receives a Master Information Block (MIB) transmitted on a broadcast channel (PBCH: Physical Broadcast Channel) or a System Information Block (SIB) transmitted on a Downlink (DL) shared channel (PDSCH: Physical Downlink Shared Channel), and obtains configuration information (that may be referred to as broadcast information or system information) for communicating with a network.

CITATION LIST

Non-Patent Literature

Non-Patent Literature 1: 3GPP TS 36.300 "Evolved Universalterrestrial Radio Access (E-UTRA) and Evolved Universalterrestrial Radio Access Network (E-UTRAN); Overall Description; Stage 2"

SUMMARY OF INVENTION

Technical Problem

It has been studied for a future radio communication system (e.g., NR or 5G) to define a resource unit including a synchronization signal and a broadcast channel as a synchronization signal block, and make an initial access based on the SS block. The synchronization signal will be also referred to as, for example, a PSS and/or an SSS or an NR-PSS and/or an NR-SSS. The broadcast channel will be also referred to as, for example, a PBCH or an NR-PBCH. The synchronization signal block will be also referred to as, for example, an SS block (Synchronization Signal block) or an SS/PBCH block.

According to the initial access that uses the SS block, an NR-PBCH that composes the SS block is used to notify a UE of, for example, information related to a domain to which a downlink control channel is configured. The downlink control channel (NR-PDCCH) configuration domain will be also referred to as, for example, a CORESET (Control Resource Set), a control resource set, a control subband, a search space set, a search space resource set, a control domain, a controlling subband or an NR-PDCCH domain.

However, how to include, for example, information (also referred to as a CORESET configuration) related to the downlink control channel configuration domain in the NR-PBCH to notify the UE is not determined, and an appropriate notification method is desired.

The present invention has been made in light of this point, and one of objects of the present invention is to provide a user terminal and a radio communication method that can appropriately notify information of a control channel configuration domain in a radio communication system that uses a synchronization signal block.

Solution to Problem

A user terminal according to one aspect of the present invention includes: a reception section that receives a Synchronization Signal (SS) block including given bit information indicating a configuration of a control resource set; and a control section that decides contents of the given bit information according to a subcarrier-spacing and/or a frequency band applied to transmission of the SS block, and controls reception of a downlink control channel.

Advantageous Effects of Invention

According to the present invention, it is possible to appropriately notify information of a control channel configuration domain in a radio communication system that uses a synchronization signal block.

BRIEF DESCRIPTION OF DRAWINGS

FIGS. 3A and 3B are diagrams illustrating another example of the SS burst set composition.

FIG. 5A illustrates one example of a table that defines a control resource set configuration, and FIG. 5B is a diagram for explaining a start position and a frequency position of a control resource set.

FIG. 6 is a diagram illustrating another example of the table that defines the control resource set configuration.

FIG. 7 is a diagram illustrating another example of the table that defines the control resource set configuration.

FIG. 8 is a diagram illustrating another example of the table that defines the control resource set configuration.

FIGS. 9A and 9B are diagrams illustrating another example of the table that defines the control resource set configuration.

FIG. 10 is a diagram illustrating another example of the table that defines the control resource set configuration.

DESCRIPTION OF EMBODIMENTS

It has been studied for a future radio communication system (e.g., LTE Rel. 14 or subsequent releases, 5G or NR) to define a signal block (also referred to as, for example, an SS/PBCH block) including a synchronization signal (also referred to as, for example, an SS, a PSS and/or an SSS, or an NR-PSS and/or an NR-SSS) and a broadcast channel (also referred to as, for example, a broadcast signal, a PBCH or an NR-PBCH). An aggregation of one or more signal blocks will be also referred to as a signal burst (also referred to as an SS/PBCH burst or an SS burst). A plurality of signal blocks in the signal burst are transmitted (also referred to as, for example, beam-swept) by different beams at different times.

The SS/PBCH block includes one or more symbols (e.g., OFDM symbols). More specifically, the SS/PBCH block may include a plurality of contiguous symbols.

A PSS, an SSS and an NR-PBCH may be arranged in one or more respectively different symbols in the SS/PBCH block. For example, it has been also studied for the SS/PBCH block that 4 or 5 symbols including 1 symbol for the PSS, 1 symbol for the SSS and 2 or 3 symbols for the PBCH compose the SS/PBCH block.

An aggregation of one or a plurality of SS/PBCH blocks may be referred to as an SS/PBCH burst. The SS/PBCH burst may include SS/PBCH blocks of contiguous frequency and/or time resources, or include SS/PBCH blocks of non-contiguous frequency and/or time resources. The SS/PBCH burst may be configured to a given periodicity (that may be also referred to as an SS/PBCH burst periodicity) or may be configured aperiodically.

Furthermore, one or a plurality of SS/PBCH bursts may be referred to as an SS/PBCH burst set (SS/PBCH burst series). The SS/PBCH burst set is periodically configured. A user terminal may control reception processing assuming that the SS/PBCH burst set is transmitted periodically (at an SS/PBCH burst set periodicity).

Figure 1A:
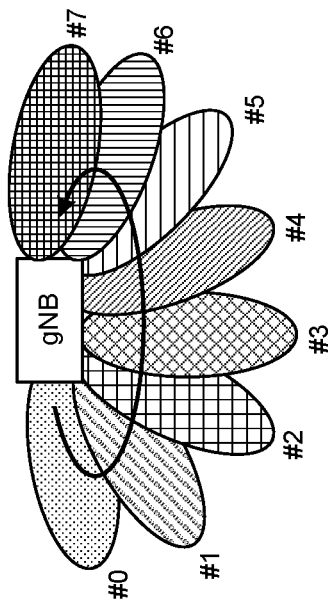
FIGS. 1A and 1B are diagrams illustrating one example of an SS block configuration.
Figure 1B:
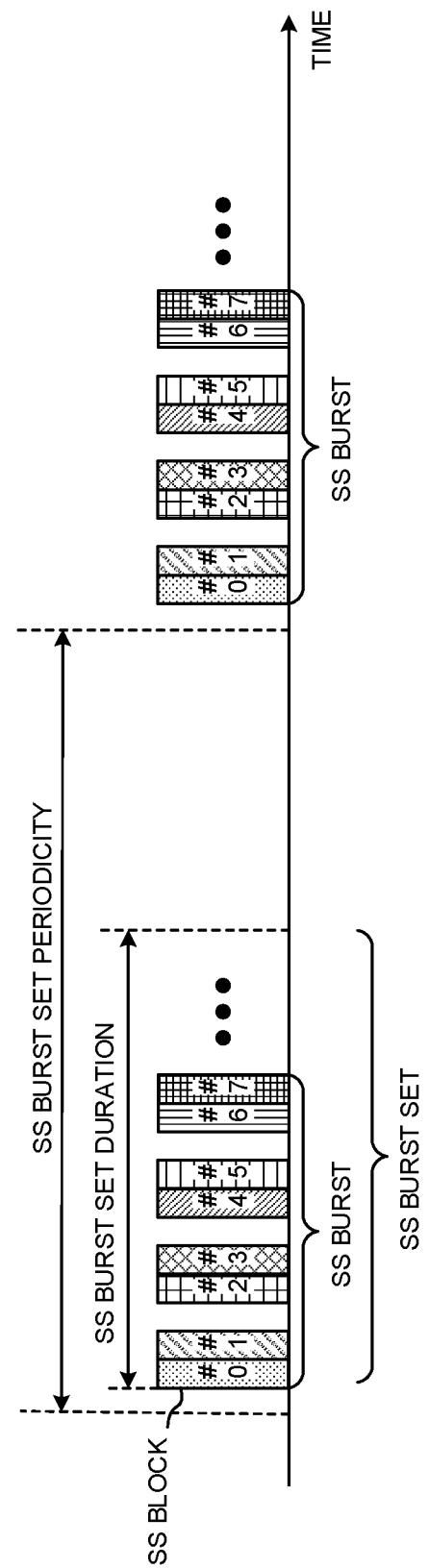

FIG. 1 is a diagram illustrating one example of an SS burst set. FIG. 1A illustrates one example of beam sweeping. As illustrated in FIGS. 1A and 1B, a radio base station (gNB) may temporarily differ (beam-sweep) beam directionality, and transmit different SS blocks by using different beams. In addition, FIGS. 1A and 1B illustrate the example where multiple beams are used. However, it is also possible to transmit an SS block by using a single beam.

As illustrated in FIG. 1B, the SS burst includes one or more SS blocks, and an SS burst set includes one or more SS bursts. For example, the SS burst includes 8 SS blocks #0 to #7 in FIG. 1B, yet is not limited to this. The SS blocks #0 to #7 may be transmitted by respectively different beams #0 to #7 (FIG. 1A).

As illustrated in FIG. 1B, the SS burst set including the SS blocks #0 to #7 may be transmitted without passing a given duration (that is, for example, 5 ms or less and will be also referred to as, for example, an SS burst set duration). Furthermore, the SS burst set may be repeated at a given periodicity (that is, for example, 5, 10, 20, 40, 80 or 160 ms and will be also referred to as, for example, an SS burst set periodicity).

In addition, in FIG. 1B, there is a given time interval respectively between the SS blocks #1 and #2, #3 and #4, and #5 and #6, yet this time interval may not be provided therebetween and may be provided between other SS blocks (e.g., between SS blocks #2 and #3 or #5 and #6). At the time interval, for example, a DL control channel (also referred to as, for example, a PDCCH: Physical Downlink Control Channel, an NR-PDCCH or Downlink Control Information (DCI)) may be transmitted, and/or a UL control channel (PUCCH: Physical Uplink Control Channel) may be transmitted from the user terminal. When, for example, each SS block includes 4 symbols, a slot of 14 symbols may include an NR-PDCCH of 2 symbols, two SS blocks, an NR-PUCCH corresponding to 2 symbols, and a guard time.

Furthermore, by using an NR-PBCH (or an NR-PBCH DMRS) included in the SS block, an index of an SS block is notified. The UE can grasp the received SS block index based on the NR-PBCH (or the NR-PBCH DMRS).

Furthermore, it has been studied that the base station notifies the UE of information related to a domain to which the downlink control channel (NR-PDCCH) is notified by using the NR-PBCH. The information related to the NR-PDCCH configuration domain may be referred to as a CORESET configuration (control resource set configuration), a control resource set configuration or an NR-PDCCH configuration.

Furthermore, it has been studied that the base station schedules system information (e.g., Remaining Minimum System Information (RMSI)) by using the NR-PDCCH. In this case, the UE receives the NR-PDCCH based on the control resource set configuration notified by the NR-PBCH, receives the NR-PDSCH scheduled by the NR-PDCCH, and obtains the system information.

On the other hand, contents to be included in the NR-PBCH and notified is not specifically determined, and a problem is how to configure a specific notification method (e.g., the number of bits and contents) of the control resource set configuration to notify the UE.

Resources that are applicable to the NR-PBCH are also limited, and therefore it is desirable to suppress a payload at a requisite minimum for the NR-PBCH, enhance redundancy, improve a detection rate and suppress a configuration range and/or a granularity of the NR-PDCCH configuration. Particularly when a frequency band is low (e.g., less than 6 GHz), the number of beams to be applied is small compared to a high frequency band, and therefore it is desirable to meet the above request.

Furthermore, when application of multiple beams in a band of the high frequency range (e.g., 6 GHz or more) is taken into account, it is desirable to configure the NR- PDCCH configuration in a wide range and/or at a fine granularity. For example, it is also considered to configure a common control resource set by using NR-PBCHs of different frequency bands and/or transmission timings.

Thus, when the control resource set configuration is notified by using the NR-PBCH included in the SS/PBCH block, it is desirable to perform control to satisfy at least one of that the number of bits used to notify the control resource set configuration in a frequency range less than a given frequency (e.g., 6 GHz) is suppressed, that the control resource set configuration is flexibly configured by taking multiple beam compatibility into account in a frequency range equal to or more than the given frequency (e.g., 6 GHz), and that the control resource set configuration is notified according to an SS burst set arrangement.

The contents (parameters) of the control resource set configuration to be notified by using the NR-PBCH includes a Bandwidth (BW) of the control resource set, a duration (e.g., the number of symbols), a start timing and a frequency position. At least one of items of contents is notified by using bit information included in the NR-PBCH.

It is considered that, when part or all of the bandwidth, the duration, the start timing and the frequency position of the control resource set are notified, a table that associates the bit information included in the NR-PBCH and contents of the control resource set configuration is defined. The UE can decide the control resource set configuration based on the bit information included in the NR-PBCH and the table configured in advance, and receive a downlink control channel transmitted by the control resource set.

For example, it is considered to define one table that defines the control resource set configuration associated with the bit information included in the NR-PBCH. In this case, irrespectively of, for example, a Subcarrier-Spacing (SCS) and/or the frequency band used for transmission of an SS block, it is possible to notify the control resource set configuration by the given bit by using one common table.

However, the future radio communication system assumes that the SS burst set arrangement also differs according to the Subcarrier-Spacing (SCS) used for transmission of SS/PBCH blocks.

An SS burst set composition applied at each subcarrier-spacing (SCS=15 kHz, 30 kHz, 120 kHz and 240 kHz in this case) will be described with reference to FIGS. 2 to 4.

Figure 2:
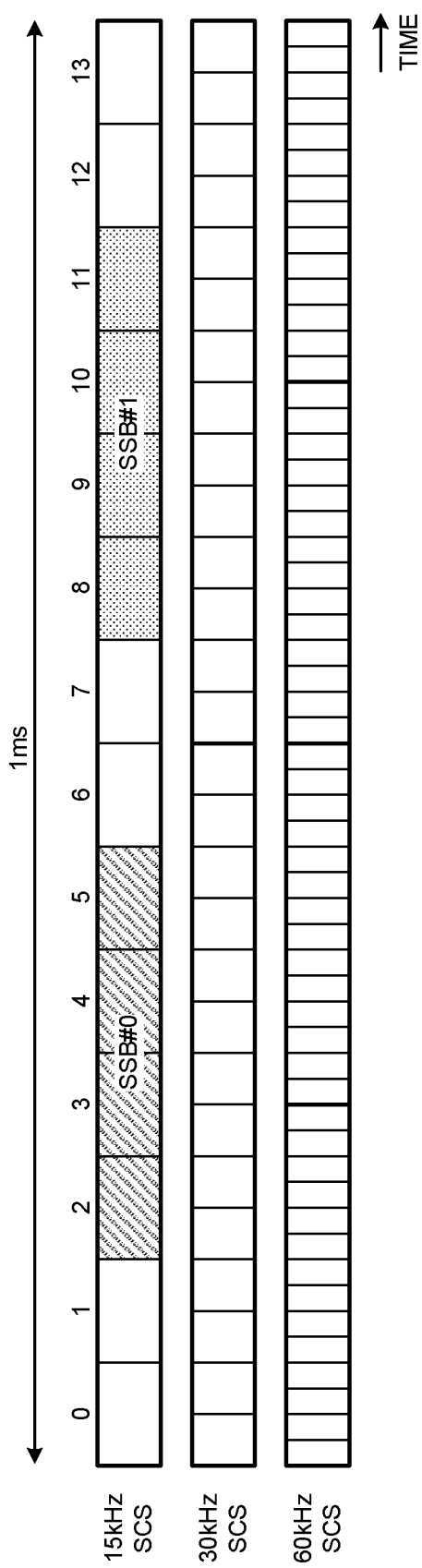
FIG. 2 is a diagram illustrating one example of an SS burst set composition.

FIG. 2 illustrates one example of an SS burst set composition in a case where a subcarrier-spacing is 15 kHz. In this case, two SS blocks (an SSB #0 and an SSB #1 in this case) are allocated in 1 slot (e.g., 1 ms). The composition illustrated in FIG. 2 is used when, for example, a frequency band is 0 to 3 GHz, and the number of SS block position candidates in the SS burst set is configured to four. Alternatively, the composition is used when the frequency band is 3 to 6 GHz, and the number of SS block position candidates in the SS burst set is configured to eight. Available frequency bands and the numbers of SS block position candidates are not limited to these.

FIG. 3 illustrates one example of an SS burst set composition in a case where a subcarrier-spacing is 30 kHz. In this case, two SS blocks (the SSB #0 and the SSB #1 or an SSB #2 and an SSB #3 in this case) are allocated in 1 slot (e.g., 0.5 ms). In addition, the SS blocks in the 1 slot may be contiguously arranged (see FIG. 3A), or may be non-contiguously arranged (see FIG. 3B). The composition illustrated in FIG. 3 is used when, for example, a frequency band is 0 to 3 GHz, and the number of SS block position candidates in the SS burst set is configured to four. Alternatively, the composition is used when the frequency band is 3 to 6 GHz, and the number of SS block position candidates in the SS burst set is configured to eight. Available frequency bands and the numbers of SS block position candidates are not limited to these.

Figure 4A:
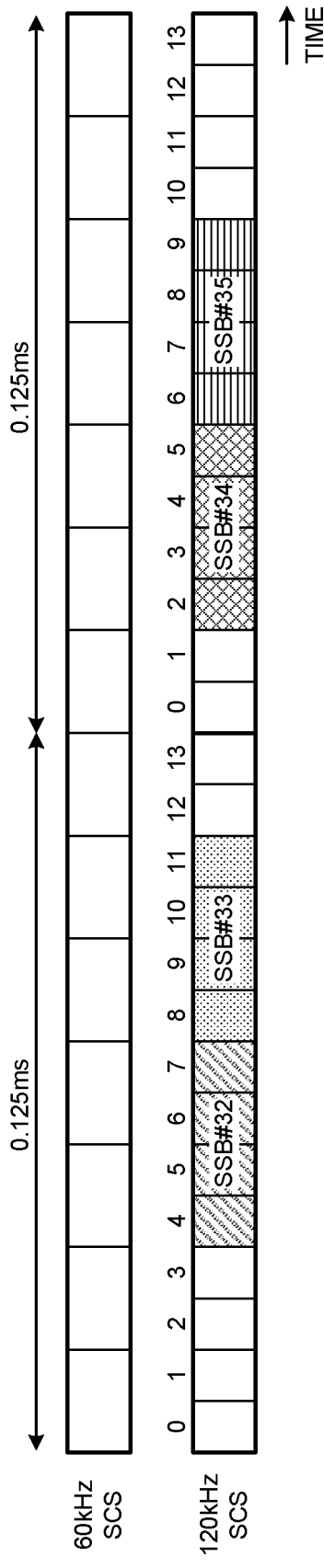
FIGS. 4A and 4B are diagrams illustrating another example of the SS burst set composition.

FIG. 4A illustrates one example of an SS burst set composition in a case where a subcarrier-spacing is 120 kHz. In this case, two SS blocks (an SSB #32 and an SSB #33 or an SSB #34 and an SSB #35 in this case) are allocated in 1 slot (e.g., 0.125 ms). The composition illustrated in FIG. 4A is used when, for example, a frequency band is 6 to 52.6 GHz, and the number of SS block position candidates in the SS burst set is configured to 64. Available frequency bands and the numbers of SS block position candidates are not limited to these.

Figure 4B:
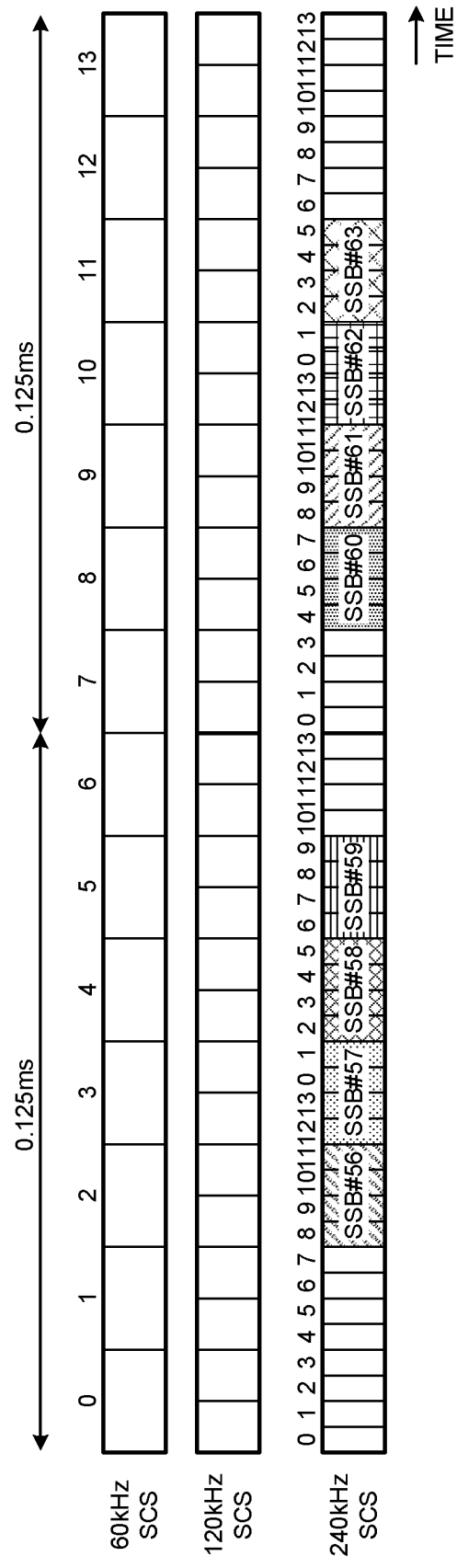

FIG. 4B illustrates one example of an SS burst set composition in a case where a subcarrier-spacing is 240 kHz. In this case, four contiguous SS blocks (SSBs #56 to #59 or SSBs #60 to #63 in this case) are allocated in 1 slot (e.g., 0.125 ms (24 OFDM symbols)). The composition illustrated in FIG. 4B is used when, for example, a frequency band is 6 to 52.6 GHz, and the number of SS block position candidates in the SS burst set is configured to 64. Available frequency bands and the numbers of SS block position candidates are not limited to these.

Thus, when SS blocks are transmitted by using a plurality of subcarrier-spacings, the SS burst set composition differs only when the subcarrier-spacing is 240 kHz. More specifically, when the subcarrier-spacings are, for example, 15 kHz, 30 kHz and 120 kHz, the number of SS blocks included in 1 slot is two, and at least three or more SS blocks are not contiguous in the composition. By contrast with this, when the subcarrier-spacing is 240 kHz, four SS blocks are contiguously arranged in the composition.

Hence, when a table is defined based on a burst set whose SCS is, for example, 15 kHz, 30 kHz or 120 kHz, it is difficult to apply the table as is to 240 kHz in the SCS. When, for example, a configuration where a control resource set is arranged in a domain (e.g., the same frequency position) adjacent to an SS block is defined in the table, there is a risk that, at 240 kHz in the SCS at which four SS blocks are contiguous, control resource sets or the SS block and the control resource set contend. On the other hand, when a common table is configured by taking burst sets of all SCSs into account, it is not possible to flexibly configure a control resource set configuration.

The inventors of this application have focused on that contents and/or a granularity of a control resource set configuration to notify desirably differ according to a subcarrier-spacing applied to transmission of an SS block, and conceived making the control resource set configuration notified by the SS block (NR-PBCH) a different configuration according to the subcarrier-spacing applied to transmission of the SS block. For example, the UE decides contents of given bit information included in the NR-PBCH according to the subcarrier-spacing applied to transmission of the SS block, and controls reception of a downlink control channel.

Furthermore, it is also assumed that, when an SS block is transmitted in a specific frequency domain (e.g., a high frequency range equal to or more than 6 GHz), multiple beams (e.g., 64 beams) are applied. Furthermore, it is also assumed that SS blocks (NR-PBCHs) respectively transmitted in different frequency domains indicate a common control resource in the specific frequency domain. In this case, there is a risk that, when a common table is applied to all frequency bands, it is not possible to flexibly configure the control resource set configuration in the high frequency range.

Hence, the inventors of this application have focused on that the contents and/or the granularity of the control resource set configuration to notify desirably differ according to a frequency domain applied to transmission of the SS block, and conceived making the control resource set configuration notified by the SS block (NR-PBCH) a different configuration according to the frequency domain applied to transmission of the SS block. For example, the UE decides the contents of the given bit information included in the NR-PBCH according to the frequency domain (or a frequency band) applied to transmission of the SS block, and controls reception of the downlink control channel.

An embodiment according to the present invention will be described in detail below with reference to the drawings. A configuration according to each embodiment may be each applied alone or may be applied in combination. Furthermore, a case where an SS block includes 4 symbols (an NR-PSS, an NR-SSS and two NR-PBCHs) will be described below. However, a configuration of the SS block is not limited to this.

(First Aspect)

According to the first aspect, a control resource set configuration notified by each SS block (NR-PBCH) is made a different configuration according to a Subcarrier-Spacing (SCS) used for transmission of each SS block. The following description will describe a case where a common control resource set configuration is used for SCSs of 15 kHz, 30 kHz, 60 kHz and 120 kHz, and a different control resource set configuration is used for 240 kHz. In this regard, classification of the SCSs that use the common control resource set configuration is not limited to this.

For example, bit information notified by SS blocks that use the SCSs of 15 kHz, 30 kHz, 60 kHz and 120 kHz (first SCSs), and a table (first table) that defines the control resource set configuration associated with the bit information are made common. On the other hand, bit information notified by an SS block that uses the SCS of 240 kHz (second SCS), and a table (second table) that defines the control resource set configuration associated with the bit information are configured differently from the first table.

More specifically, the number of bits and/or contents used to notify the control resource set configuration are configured to differ between the first SCS and the second SCS. Hereinafter, a case (configuration 1) where different numbers of bits are applied to notify the control resource set configurations of the first SCS and the second SCS, and a case (configuration 2) where the number of bits is common and items of different contents are notified will be described.

(Configuration 1)

For example, bit information of 4 bits are used in an SS block that uses the first SCS to notify the control resource set configuration, and bit information of 5 bits is used in the SS block that uses the second SCS to notify the control resource set configuration. In addition, at least more bits only need to be applied to the second SCS compared to the first SCS, and the number of bits is not limited to this. Consequently, when the second SCS is applied, it is possible to notify the more control resource set configurations compared to the first SCS, so that it is possible to reserve sufficient options for given SCSs.

FIG. 5A illustrates one example of the first table in a case where the bit information of the 4 bits is used to notify the control resource set configuration. In this case, FIG. 5A illustrates a case where a Bandwidth (BW), a duration (e.g., the number of symbols), a start timing and a frequency position are configured as the control resource set configuration to the table.

In FIG. 5A, 24 PRBs, 48 PRBs and 96 PRBs are defined as bandwidths of the control resource set. Furthermore, one of 1 to 3 symbols is defined as the duration of the control resource set. One of S1 to S3 is defined as the start position of the control resource set. One of F1 to F3 is defined as the frequency position of the control resource set.

The start positions S1 to S3 of the control resource set may be configured as follows, for example (see FIG. 5B).
S1: An OFDM symbol after an SS block (OFDM symbol after SS block)
S2: A first OFDM symbol of the same slot as that of the SS block (First OFDM symbol of the same slot)
S3: A first OFDM symbol of the SS block (First OFDM symbol of SS block)

The start positions F1 to F3 of the control resource set may be configured as follows, for example (see FIG. 5B).
F1: The same PRBs as those of SS block (same PRBs occupied by the SS block)
F2: Upper and lower PRBs adjacent to the SS block in a frequency (With equal number of PRBs immediately below and above the SS block in frequency)
F3: A center of the CORESET and a center of the SS block are aligned (With the center of the CORESET BW aligned with the center of the SS block)

In addition, contents (e.g., parameters and numerical values) defined in the table is not limited to these.

FIG. 6 illustrates one example of the second table in a case where the bit information of the 5 bits is used to notify the control resource set configuration. In this case, FIG. 6 illustrates a case where a Bandwidth (BW), a duration (e.g., the number of symbols), a start timing and a frequency position are configured as the control resource set configuration to the table.

In FIG. 6, 24 PRBs, 48 PRBs and 96 PRBs are defined as bandwidths of the control resource set. Furthermore, one of 1 to 3 symbols is defined as the duration of the control resource set. One of S1 to S3 and, in addition, S8, S9, S10, S11, S12 and S14 is defined as the start position of the control resource set. One of F1 to F3 is defined as the frequency position of the control resource set.

S8 to S14 each correspond to the number of OFDM symbols before an SS block. That is, S8 indicates that an OFDM symbol that is 8 OFDM symbols before the SS block is the start position. Similarly, S9 indicates that an OFDM symbol that is 9 OFDM symbols before the SS block is the start position.

The control resource set configuration that supports more pieces of bit information than those of the table 1 is defined in the table 2. In FIG. 6, more patterns of the start position of the control resource set compared to the table 1 are defined in the table 2. By defining more details of the start position, it is possible to flexibly configure a position (e.g., start position) of the control resource set to be notified by each SS block even when four SS blocks are contiguous.

Thus, more types (patterns) of at least the start position are configured to the control resource set configuration of the second SCS compared to the control resource set configuration of the first SCS. In addition, different items of contents (e.g., numerical values) of other parameters (e.g., the bandwidth, the duration and the frequency position) may be also defined between the control resource set configuration of the first SCS and the control resource set configuration of the second SCS.

(Configuration 2)

For example, the bit information of the 4 bits may be used for an SS block that uses the first SCS, and an SS block that uses the second SCS to notify different control resource set configurations.

FIG. 7 illustrates one example of the second table (that is used for transmission of the second SCS) in a case where the bit information of the 4 bits is used to notify the control resource set configuration. In this regard, FIG. 7 illustrates a case where a bandwidth (BW), a duration (e.g., the number of symbols), a start timing, and a frequency position are configured as the control resource set configuration to the table. In addition, the first table used for transmission of the first SCS may have the same contents as that in FIG. 5A.

In FIG. 7, 24 PRBs, 48 PRBs and 96 PRBs are defined as bandwidths of a control resource set. Furthermore, one of 1 to 3 symbols is defined as a duration of the control resource set. One of S1 to S3, S8, S9 and S10 is defined as a start position of the control resource set. One of F1 to F3 is defined as a frequency position of the control resource set.

Start positions S1 to S3 and S8 to S10 of the control resource set may be configured as follows, for example.
S1: An OFDM symbol after an SS block
S2: A first OFDM symbol of the same slot as that of the SS block
S3: A first OFDM symbol of the SS block
S8: An OFDM symbol that is 8 OFDM symbols before the SS block
S9: An OFDM symbol that is 9 OFDM symbols before the SS block
S10: An OFDM symbol that is 10 OFDM symbols before the SS block Thus, when the first table and the second table are defined in association with the same bit information (e.g., 4 bits), more types (patterns) of a start position of an SS block are defined in the second table. Consequently, even when SS burst sets (e.g., the numbers of contiguous SS blocks) are different between the first SCS and the second SCS, it is possible to flexibly configure the control resource set configuration according to each SS burst set.

In addition, FIG. 7 illustrates a case where the number of symbols of an SS block is specifically defined as a start position of a control resource set, yet is not limited to this. For example, the start position of the control resource set notified by the SS block may be determined based on an SS block index (see FIG. 8). In addition, when the table illustrated in FIG. 8 is the second table, the first table may have the same contents as that in above FIG. 5A.

In FIG. 8, one of S1, S3 and SZ is defined as the start position of the control resource set. In this regard, SZ indicates an OFDM symbol that is Z OFDM symbols before an SS block, and Z is a value related to an SS block index. Z may be, for example, a value calculated according to following equation (1). In addition, a modulo operation used for following equation (1) corresponds to the number of contiguous SS blocks (4 in this case) in a slot, and can be optionally changed according to an SS burst set composition (e.g., a contiguous SS block configuration).

$$Z = 8 + S \times Y \quad \text{Equation (1)}$$

X: SS block index
S: Duration of control resource set (the number of symbols)
Y=X mod 4

Thus, by employing a configuration to compute the start position of the control resource from the SS block index, it is possible to reduce the number of patterns of a start position (a defined number of types of the start position) defined in the second table. Consequently, it is possible to decrease a bit value of bit information notified by an SS block transmitted by applying the second SCS (e.g., make the bit value the same bit value as that in a case where the first SCS is used), and flexibly control the start position. In addition, the first table may be configured to compute the start position for the first SCS, too, by using an SS block index.

(Second Aspect)

According to the second aspect, a control resource set configuration notified by each SS block (NR-PBCH) is made a different configuration according to a frequency band used for transmission of an SS block. The following description will describe a case where different control resource set configurations (e.g., different tables) are used for a band (first band) less than 6 GHz and a band (second band) equal to or more than 6 GHz.

For example, the number of bits and/or contents used to notify the control resource set configuration are configured to differ between the first band and the second band. A case where different numbers of bits are applied to notify control resource set configurations of the first band and the second band will be described below.

For example, a control resource set configuration is notified by using bit information of 4 bits in an SS block that uses the first band, and a control resource set configuration is notified by using bit information of 12 bits in an SS block that uses the second band. In addition, more bits only need to be applied to at least the second band compared to the first band, and the number of bits is not limited to this.

FIGS. 9 and 10 illustrate one example of a table (third table) that is used to notify the control resource set configuration in the second band. In addition, the third table corresponds to a case where bit information of 12 bits is used to notify the control resource set configuration. In addition, as a table used to notify the control resource set configuration in the first band, a table (e.g., FIG. 5) described in the above first aspect can be used.

FIG. 9A illustrates a table that defines a bandwidth and a duration of a control resource set by using 3 bits. Furthermore, FIG. 9B illustrates a table that defines a start position of a control resource set by using 4 bits. Furthermore, FIG. 10 illustrates a table that defines a start position of a control resource set by using 5 bits.

In FIG. 9A, 24 PRBs, 48 PRBs, 96 PRBs and 154 PRBs are defined as bandwidths of the control resource set. Furthermore, one of 1 to 3 symbols is defined as a duration of the control resource set. In FIG. 9B, one of SB2, SB4, SB6, SB8, SB10, SB12, SB14, ST1, ST3, SN1, SA3, SA5, SA7, SA9, SA11 and SA13 is defined as the start position of the control resource set.

As the start position of the control resource set, SBX indicates an OFDM symbol that is X OFDM symbols before an SS block (X OFDM symbol before SS block). For example, SB2 indicates an OFDM symbol that is 2 OFDM symbols before an SS block. STX indicates an Xth OFDM symbol in an SS block (X OFDM symbol of SS block). For example, ST1 indicates a first OFDM symbol of the SS block. SN1 indicates a next OFDM symbol after the SS block (Next OFDM symbol after SS block). SAX indicates an Xth OFDM symbol after the SS block (X OFDM symbol after SS block). For example, SA2 indicates a second OFDM symbol after the SS block.

In FIG. 10, one of the same center frequency (F) as that of the SS block and an offset value (the number of PRBs) from the center frequency (F) of this SS block is defined as a frequency position of the control resource set. A given number of PRBs (e.g., +12, +24, +36 . . . , +180, −12, −24, −36, . . . or −180) is configured as the offset value.

Thus, by notifying the UE of an offset from the frequency position (center frequency) of the SS block as a frequency position of a control resource set notified by each SS block, it is possible to flexibly control the frequency position of the control resource set. Consequently, it is possible to notify a common control resource set by a different SS block.

Thus, by changing the number of patterns of the control resource set configuration notified by each SS block based on the frequency band, it is possible to flexibly control a configuration of the control resource set according to communication environment. In a case where, for example, the second band (e.g., high frequency range) is applied, a configuration where more control resource set configurations compared to the first band can be notified is employed. Consequently, it is possible to perform a flexible operation of, for example, notifying the common control resource set configuration by a different NR-PBCH in the high frequency range to which a multiple beam operation is applied.

Modified Example

The first aspect and the second aspect may be applied in combination as appropriate. For example, the first aspect may employ a configuration where, in a case of a given bandwidth (e.g., 6 GHz or more), a frequency position (e.g., frequency offset) of a control resource set is notified to the UE.

When, for example, the first SCS is used, the first table (see, for example, FIG. 5A) and the bit information associated with the first table are used. When the second SCS is used, the second table (see, for example, FIG. 6, 7 or 8) and the bit information associated with the second table are used. Furthermore, when an SS block is transmitted by using the given bandwidth (e.g., 6 GHz or more) at each SCS, bit information (see, for example, FIG. 10) indicating the frequency position (e.g., frequency offset) of the control resource set may be additionally notified to the UE.

Consequently, it is possible to flexibly control the configuration of the control resource set by taking into account the SCS and the frequency band used for transmission of the SS block.

In addition, the tables that define the control resource set configurations described in the present embodiment may be defined in advance by a specification, or may be configured by downlink control information and/or a higher layer signaling (e.g., an RRC signaling and/or broadcast information) from the base station to the UE.

(Radio Communication System)

The configuration of the radio communication system according to one embodiment of the present invention will be described below. This radio communication system uses one or a combination of each of the above aspects of the present invention to perform communication.

Figure 11:
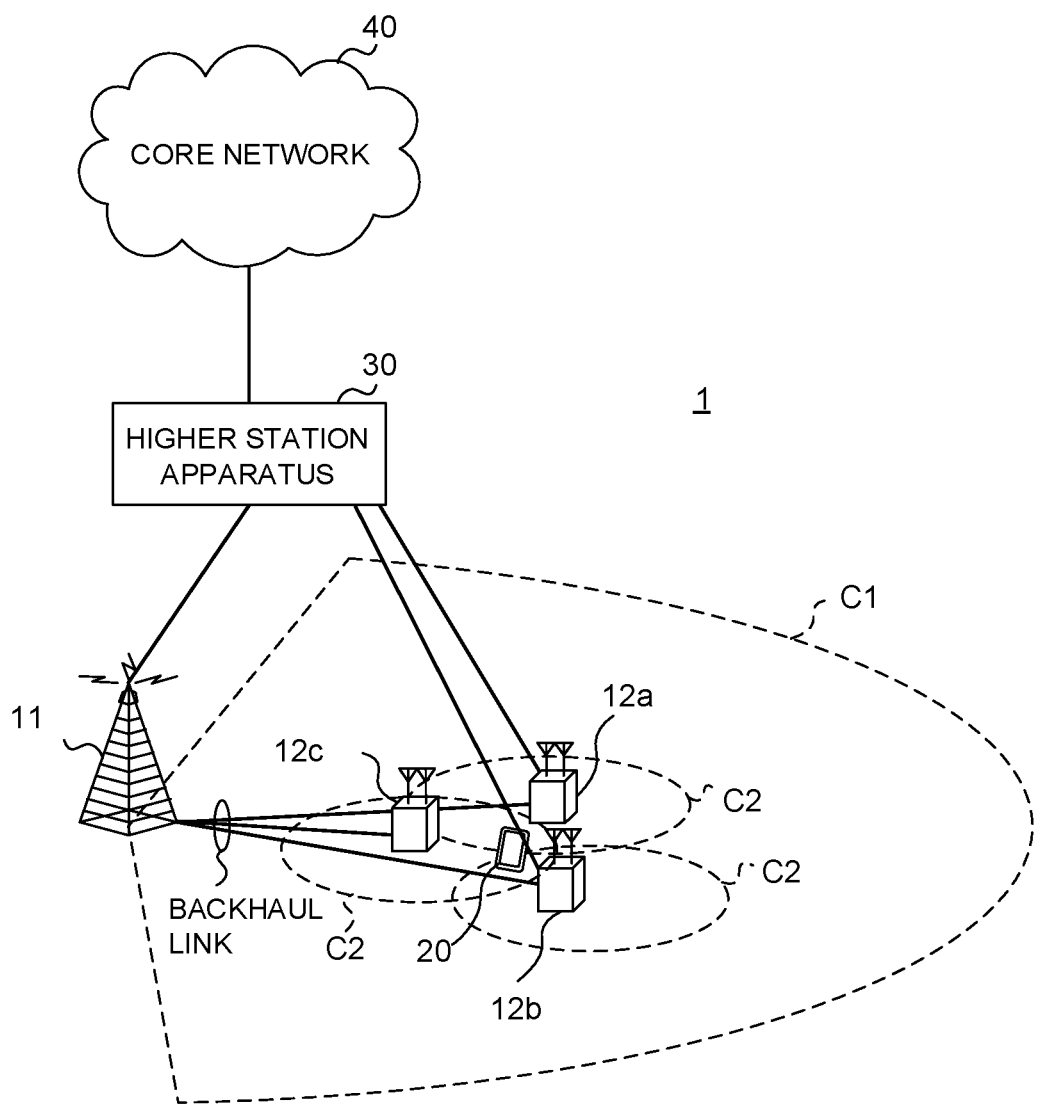
FIG. 11 is a diagram illustrating one example of a schematic configuration of a radio communication system according to one embodiment of the present invention.

FIG. 11 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more). For example, according to DC, an MeNB (MCG) adopts LTE cells, and an SeNB (SCG) adopts NR/5G-cells to perform communication.

The user terminal 20 and the radio base station 11 can communicate by using a carrier (referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier-Frequency Division Multiple Access (SC-FDMA) to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are conveyed on the PDSCH. Furthermore, Master Information Blocks (MIBs) are conveyed on the PBCH. A common control channel for notifying whether or not there is a paging channel is mapped on a downlink L1/L2 control channel (e.g., PDCCH), and data of the paging channel (PCH) is mapped on the PDSCH. A downlink reference signal, an uplink reference signal and a physical downlink synchronization signal are additionally arranged.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and the PUSCH is conveyed on the PDCCH. The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARD) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator) and transmission acknowledgement information are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be conveyed is not limited to these.

(Radio Base Station)

Figure 12:
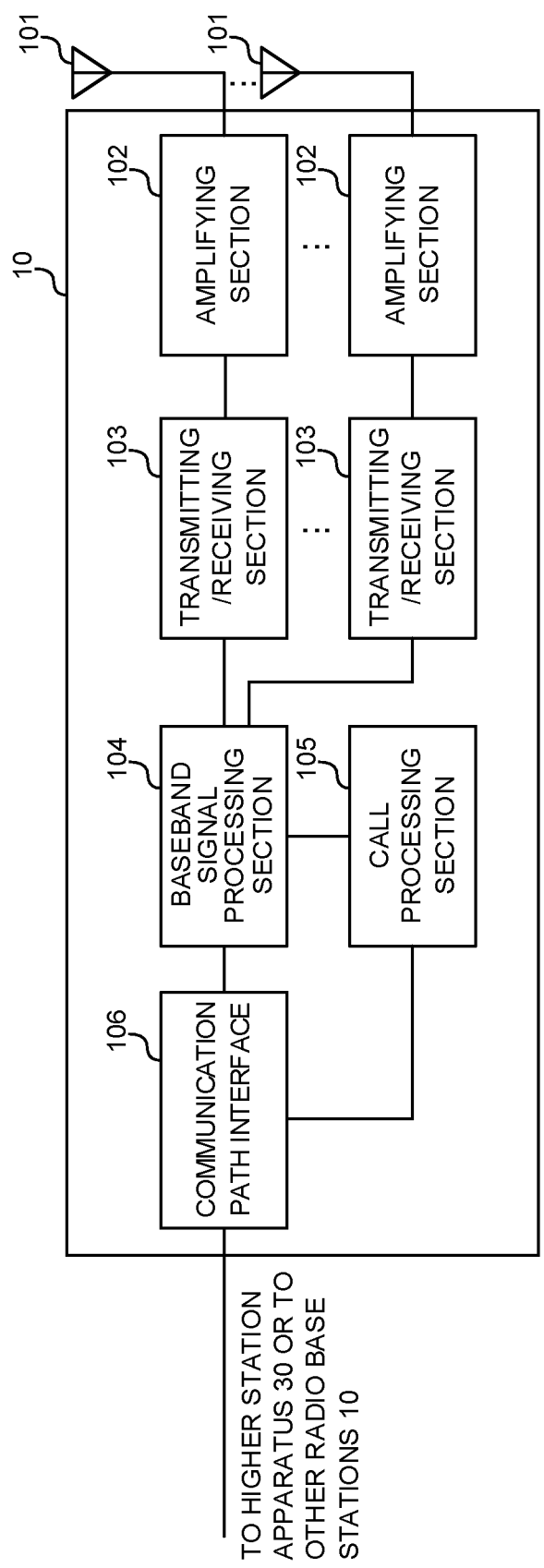
FIG. 12 is a diagram illustrating one example of an overall configuration of a radio base station according to the one embodiment of the present invention.

FIG. 12 is a diagram illustrating one example of an overall configuration of the radio base station according to the one embodiment of the present invention. The radio base station 10 includes pluralities of transmission/reception antennas 101, amplifying sections 102 and transmitting/receiving sections 103, a baseband signal processing section 104, a call processing section 105 and a channel interface 106. In this regard, the radio base station 10 only needs to be configured to include one or more of each of the transmitting/receiving antennas 101, the amplifying sections 102 and the transmitting/receiving sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmitting/receiving antenna 101. The transmitting/receiving sections 103 can be composed of transmitters/receivers, transmitting/receiving circuits or transmitting/receiving apparatuses described based on a common knowledge in a technical field according to the present invention. In this regard, the transmitting/receiving sections 103 may be composed as an integrated transmitting/receiving section or may be composed of transmission sections and reception sections.

Meanwhile, each amplifying section 102 amplifies a radio frequency signal received by each transmitting/receiving antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the channel interface 106. The call processing section 105 performs call processing such as configuration and release of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

In addition, each transmitting/receiving section 103 includes given bit information indicating a control resource set configuration in an SS block (e.g., NR-PBCH) to transmit. Furthermore, each transmitting/receiving section 103 transmits a downlink control channel (NR-PDCCH) in the control resource set notified by the SS block. Furthermore, each transmitting/receiving section 103 may notify the UE of a table that defines the control resource set configuration by, for example, a higher layer signaling.

Figure 13:
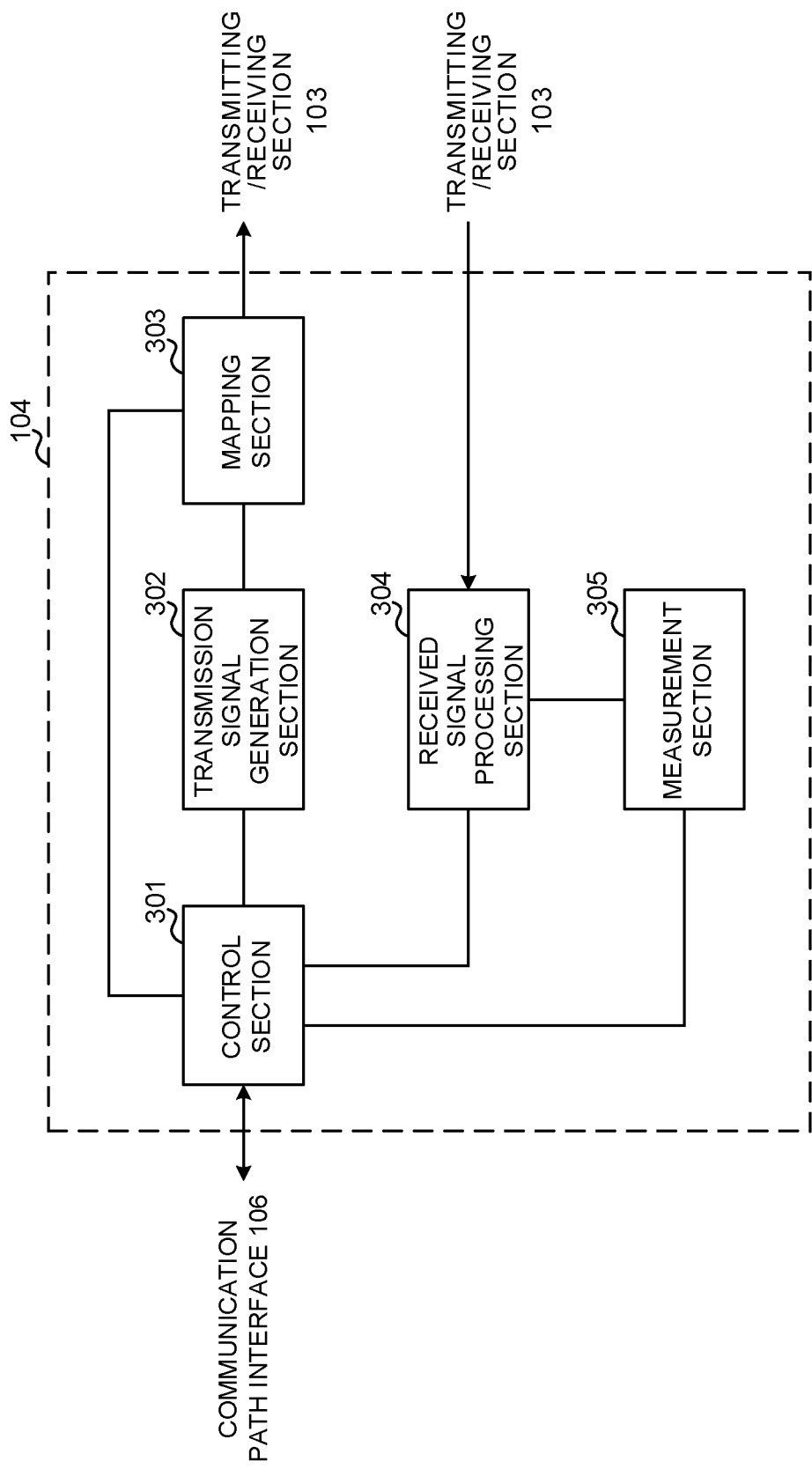
FIG. 13 is a diagram illustrating one example of a function configuration of the radio base station according to the one embodiment of the present invention.

FIG. 13 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104. The baseband signal processing section 104 includes a digital beam forming function that provides digital beam forming.

The control section (scheduler) 301 controls the entire radio base station 10. The control section 301 can be composed of a controller, a control circuit or a control apparatus described based on the common knowledge in the technical field according to the present invention.

The control section 301 controls, for example, signal (including signals matching a synchronization signal, an MIB, a paging channel and a broadcast channel) generation of the transmission signal generating section 302, and signal allocation of the mapping section 303.

The control section 301 performs control to include the given bit information indicating the control resource set configuration in the SS block (e.g., NR-PBCH) to transmit. Furthermore, the control section 301 performs control to transmit the downlink control channel (NR-PDCCH) in the control resource set notified by the SS block.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink signal allocation information, and a UL grant for notifying uplink signal allocation information based on the instruction from the control section 301. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure, for example, received power (e.g., Reference Signal Received Power (RSRP)), received quality (e.g., Reference Signal Received Quality (RSRQ) or a Signal to Interference plus Noise Ratio (SINR)) and/or a channel state of the received signal. The measurement section 305 may output a measurement result to the control section 301.

(User Terminal)

Figure 14:
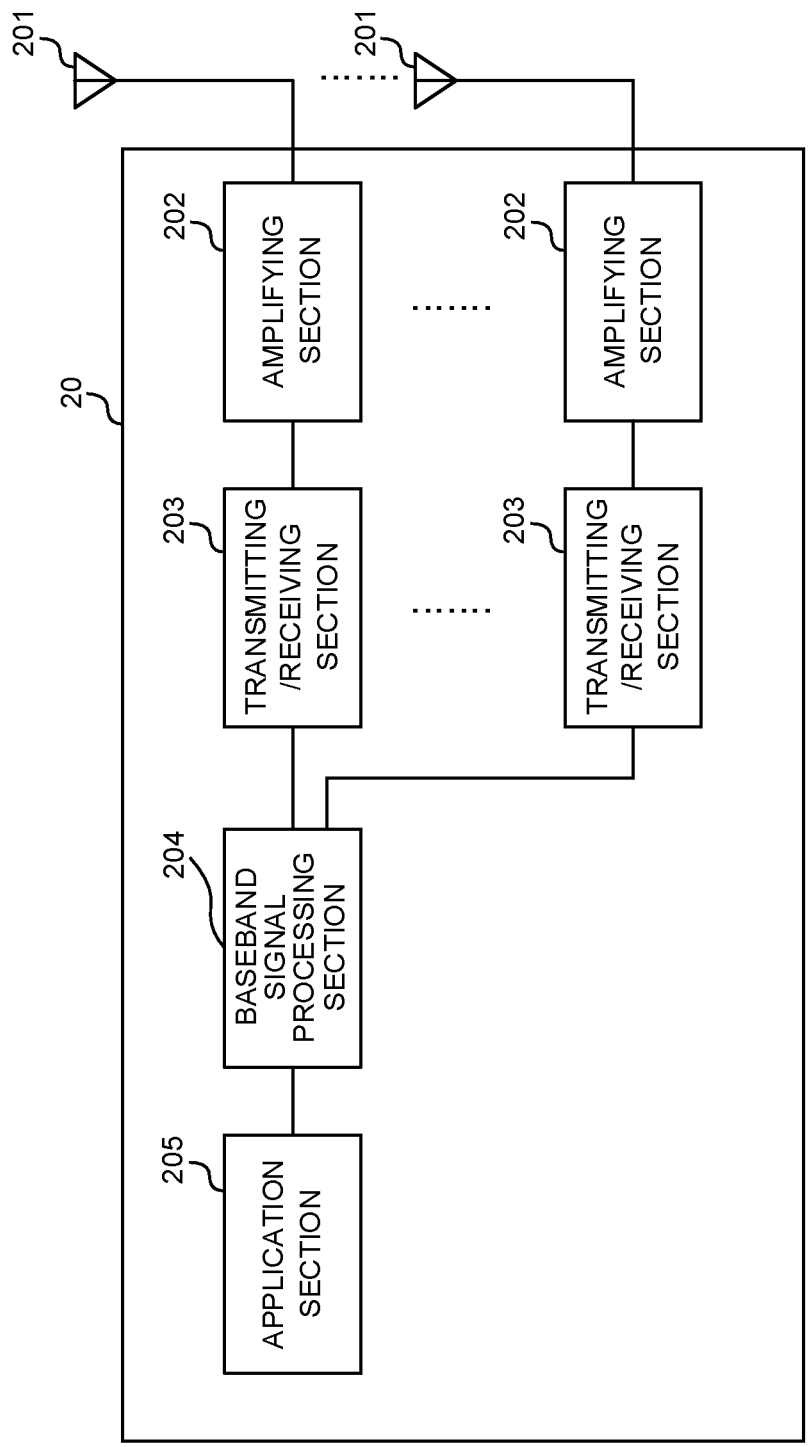
FIG. 14 is a diagram illustrating one example of an overall configuration of a user terminal according to the one embodiment of the present invention.

FIG. 14 is a diagram illustrating one example of an overall configuration of the user terminal according to the one embodiment of the present invention. The user terminal 20 includes pluralities of transmitting/receiving antennas 201, amplifying sections 202 and transmitting/receiving sections 203, a baseband signal processing section 204 and an application section 205. In this regard, the user terminal 20 only needs to be configured to include one or more of each of the transmitting/receiving antennas 201, the amplifying sections 202 and the transmitting/receiving sections 203.

Each amplifying section 202 amplifies a radio frequency signal received at each transmitting/receiving antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmitting/receiving circuits or transmitting/receiving apparatuses described based on the common knowledge in the technical field according to the present invention. In this regard, the transmitting/receiving sections 203 may be composed as an integrated transmitting/receiving section or may be composed of transmission sections and reception sections.

The baseband signal processing section 204 performs FFT processing, error correcting decoding, and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 transfers broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmitting/receiving section 203. Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmitting/receiving antenna 201.

In addition, each transmitting/receiving section 203 may further include an analog beam forming section that performs analog beam forming. The analog beam forming section can be composed of an analog beam forming circuit (e.g., a phase shifter or a phase shift circuit) or an analog beam forming apparatus (e.g., a phase shifter) described based on the common knowledge in the technical field according to the present invention. Furthermore, each transmitting/receiving antenna 201 can be composed of an array antenna, for example.

Each transmitting/receiving section 203 receives the SS block (e.g., NR-PBCH) including the given bit information indicating the control resource set configuration. Furthermore, each transmitting/receiving section 203 receives the downlink control channel (NR-PDCCH) in the control resource set notified by the SS block. Furthermore, each transmitting/receiving section 203 may receive the table that defines the control resource set configuration by, for example, a higher layer signaling.

Figure 15:
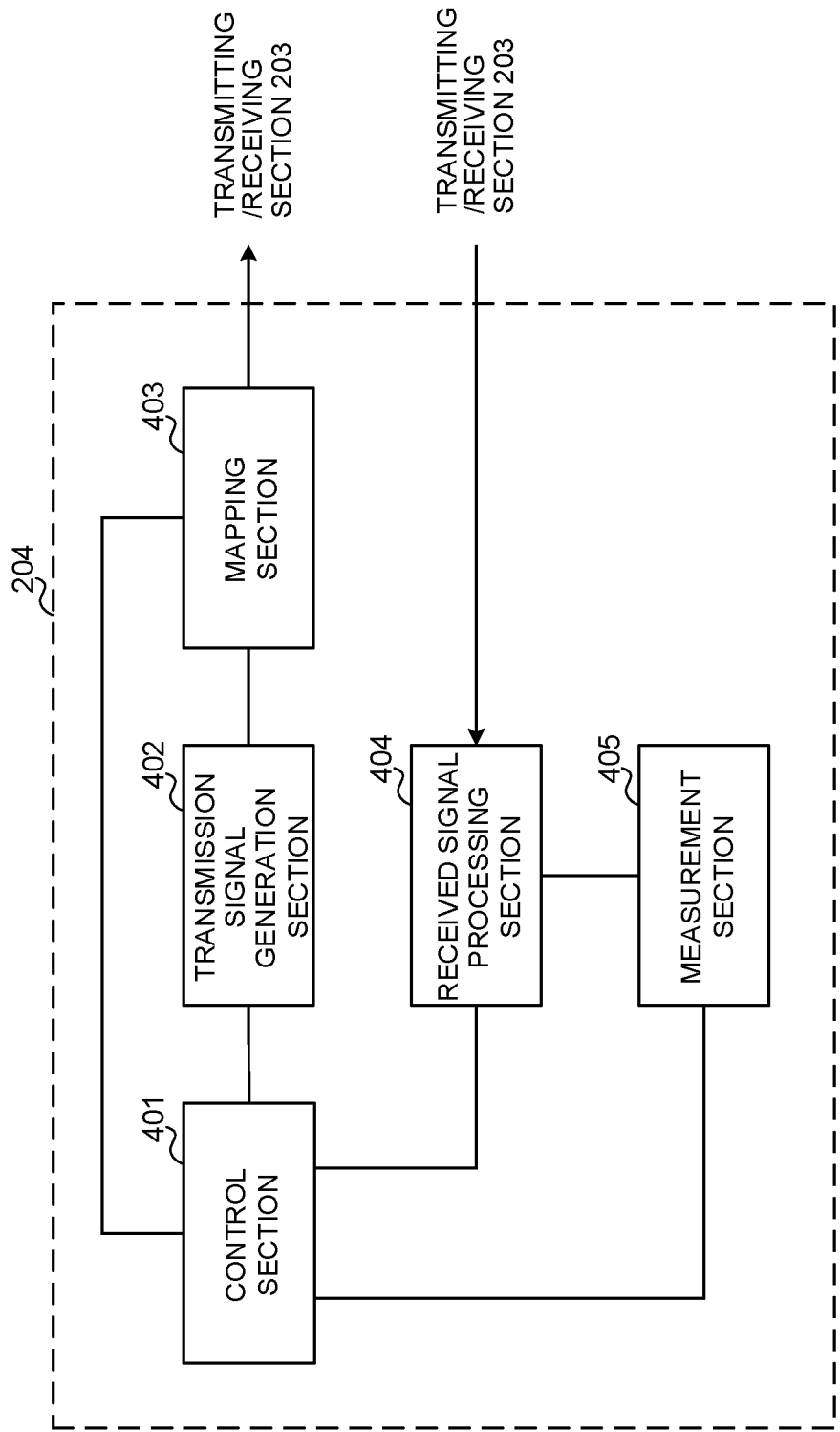
FIG. 15 is a diagram illustrating one example of a function configuration of the user terminal according to the one embodiment of the present invention.

FIG. 15 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 decides contents (e.g., the table to use) of the given bit information included in the SS block (e.g., NR-PBCH) according to a subcarrier-spacing and/or a frequency band applied to transmission of the SS block, and controls reception of the downlink control channel. For example, the control section 401 refers to a different table based on the subcarrier-spacing and/or the frequency band applied to transmission of the SS block, and decides the contents of the given bit information.

In one example, a first table is applied to a first subcarrier-spacing (15/30/60/120 kHz), and a second table is applied to a second subcarrier-spacing (240 kHz). Alternatively, the different tables are applied to the first frequency band (e.g., less than 6 GHz) and the second frequency band (e.g., 6 GHz or more).

For example, the numbers of patterns of at least a start position of the control resource set are differently defined in the different tables. Furthermore, the number of bits of the bit information may differ according to the subcarrier-spacing and/or the frequency band applied to transmission of the SS block. The start position of the control resource set may be defined in at least one of the different tables by using an SS block index.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and/or Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 receives a synchronization signal and a broadcast channel transmitted by the radio base station by applying beam forming based on the instruction from the control section 401. Particularly, the received signal processing section 404 receives the synchronization signal and the broadcast channel allocated to at least one of a plurality of time domains (e.g., symbols) that compose a given transmission time interval (e.g., a subframe or a slot).

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and the signal after the reception processing to the measurement section 405.

The measurement section 405 performs measurement related to the received signal. For example, the measurement section 405 performs measurement by using a beam forming RS transmitted from the radio base station 10. The measurement section 405 can be composed of a measurement instrument, a measurement circuit or a measurement apparatus described based on the common knowledge in the technical field according to the present invention.

The measurement section 405 may measure, for example, received power (e.g., RSRP), received quality (e.g., RSRQ or a received SINR) and/or a channel state of the received signal. The measurement section 405 may output a measurement result to the control section 401. For example, the measurement section 405 performs RRM measurement that uses the synchronization signal.

(Hardware Configuration)

In addition, the block diagrams used to describe the above embodiment illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of these apparatuses formed by connecting two or more physically and/or logically separate apparatuses directly and/or indirectly (by way of, for example, wired connection and/or radio connection).

Figure 16:
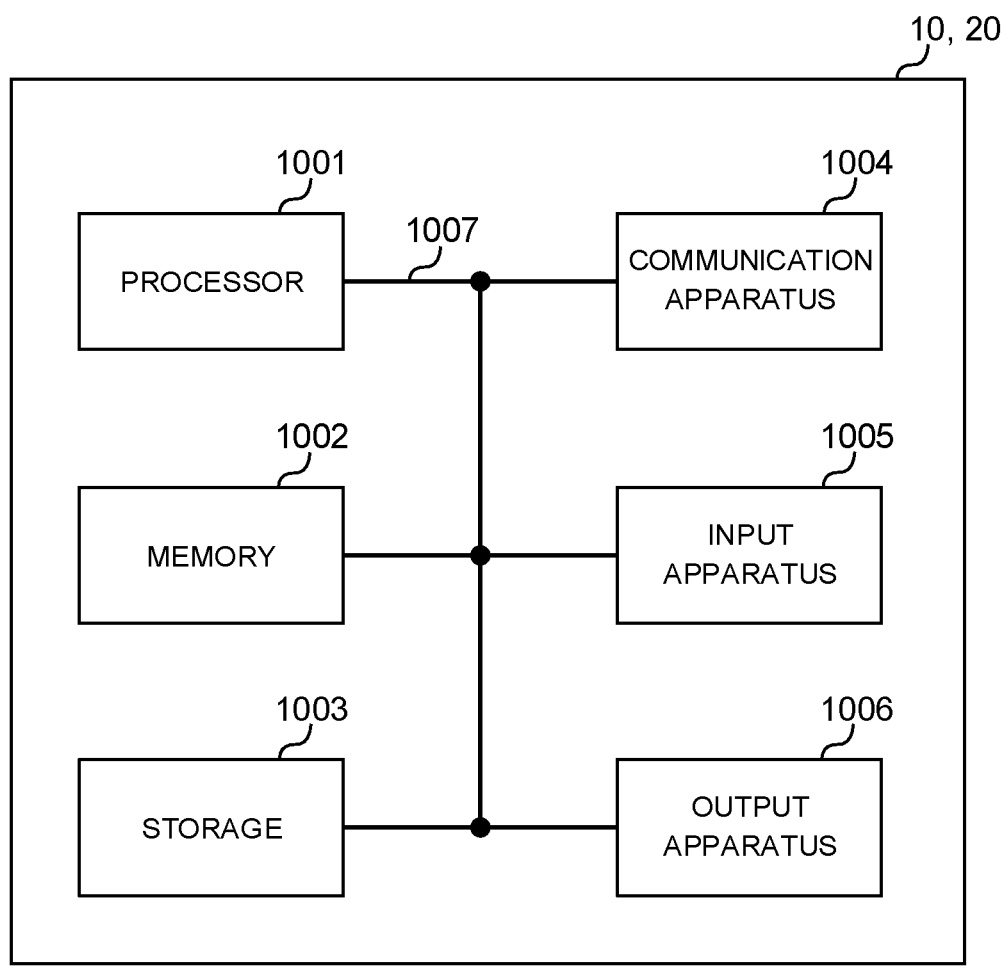
FIG. 16 is a diagram illustrating one example of hardware configurations of the radio base station and the user terminal according to the one embodiment of the present invention.

For example, the radio base station and the user terminal according to one embodiment of the present invention may function as computers that perform processing of the radio communication method according to the present invention. FIG. 16 is a diagram illustrating one example of the hardware configurations of the radio base station and the user terminal according to the one embodiment of the present invention. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 16 or may be configured without including part of the apparatuses.

For example, FIG. 16 illustrates the only one processor 1001. However, there may be a plurality of processors. Furthermore, processing may be executed by 1 processor or processing may be executed by 1 or more processors concurrently, successively or by another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication of the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmitting/receiving device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmitting/receiving antennas 101 (201), amplifying sections 102 (202), transmitting/receiving sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 and/or the memory 1002 is connected by the bus 1007 that communicates information. The bus 1007 may be composed of a single bus or may be composed of a bus that differs between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

Modified Example

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. Furthermore, the slot may include one or a plurality of symbols (Orthogonal Frequency Division Multiplexing (OFDM) symbols or Single Carrier-Frequency Division Multiple Access (SC-FDMA) symbols) in the time-domain.

The radio frame, the subframe, the slot and the symbol each indicate a time unit for conveying signals. The other corresponding names may be used for the radio frame, the subframe, the slot and the symbol. For example, 1 subframe may be referred to as a Transmission Time Interval (TTI), a plurality of contiguous subframes may be referred to as TTIs, or 1 slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms.

In this regard, the TTI refers to, for example, a minimum time unit of scheduling for radio communication. For example, in the LTE system, the radio base station performs scheduling for allocating radio resources (a frequency bandwidth and/or transmission power that can be used in each user terminal) in TTI units to each user terminal. In this regard, a definition of the TTI is not limited to this. The TTI may be a transmission time unit of a channel-coded data packet (transport block), or may be a processing unit of scheduling and/or link adaptation.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a reduced subframe or a short subframe.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 subframe or 1 TTI. 1 TTI or 1 subframe may each include one or a plurality of resource blocks. In this regard, an RB may be referred to as a Physical Resource Block (PRB: Physical RB), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot and symbol are only exemplary structures. For example, configurations such as the number of subframes included in a radio frame, the number of slots included in a subframe, the numbers of symbols and RBs included in a slot, the number of subcarriers included in an RB, the number of symbols in a TTI, a symbol length and a Cyclic Prefix (CP) length can be variously changed.

Furthermore, the information and parameters described in this description may be expressed by absolute values, may be expressed by relative values with respect to given values or may be expressed by other corresponding information. For example, a radio resource may be instructed by a given index. Furthermore, numerical expressions that use these parameters may be different from those explicitly disclosed in this description.

Names used for parameters in this description are in no respect restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by a management table. The information and signals to be input and output can be overwritten, updated or additionally written. The output information and signals may be deleted. The input information and signals may be transmitted to other apparatuses.

Notification of information is not limited to the aspects/ embodiment described in this description and may be performed by other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (Master Information Blocks (MIBs) and System Information Blocks (SIBs)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal).

Furthermore, the RRC signaling may be referred to as an RRC message, and may be, for example, an Rrcconnectionsetup message or an Rrcconnectionreconfiguration message. Furthermore, the MAC signaling may be notified by, for example, an MAC Control Element (MAC CE).

Furthermore, notification of given information (e.g., notification of "being X") is not limited to explicit notification, and may be performed implicitly (by, for example, not notifying this given information or by notifying another information). Decision may be made based on a value (0 or 1) expressed as 1 bit, may be made based on a Boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description are compatibly used.

In this description, the terms "Base Station (BS)", "radio base station", "eNB", "cell", "sector", "cell group", "carrier" and "component carrier" can be compatibly used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station will be also referred to as a term such as a fixed station, a NodeB, an eNodeB (eNB), an access point, a transmission point, a reception point, a femtocell or a small cell in some cases.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and/or "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, specific operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically, logically or by way of a combination of the physical and logical connections. It can be understood that, when used in this description, the two elements are "connected" or "coupled" with each other by using 1 or more electric wires, cables and/or printed electrical connection, and by using electromagnetic energy having wavelengths in radio frequency domains, microwave domains and (both of visible and invisible) light domains in some non-restrictive and non-comprehensive examples.

When the words "including" and "comprising" and modifications of these words are used in this description or the claims, these words intend to be comprehensive similar to the word "having". Furthermore, the word "or" used in this description or the claims intends not to be an XOR.

The present invention has been described in detail above. However, it is obvious for a person skilled in the art that the present invention is not limited to the embodiment described in this description. The present invention can be carried out as modified and changed aspects without departing from the gist and the scope of the present invention defined by the recitation of the claims. Accordingly, the disclosure of this description is intended for exemplary explanation, and does not have any restrictive meaning to the present invention.

The invention claimed is:

1. A terminal comprising:
   a receiver that receives master information blocks including an information indicating a configuration of a control resource set; and
   a processor that controls reception of a downlink control channel, based on the information and a subcarrier spacing applied to transmission of a synchronization signal (SS) block,
   wherein the information has a bit length of 4 bits irrespective of different values of the subcarrier spacing among a plurality of candidate values.

2. The terminal according to claim 1, wherein the processor determines, based on an index of the SS block, a start symbol of the control resource set.

3. A radio communication method for a terminal comprising:
   receiving master information blocks including an information indicating a configuration of a control resource set; and
   controlling reception of a downlink control channel, based on the information and a subcarrier spacing applied to transmission of a synchronization signal (SS) block,
   wherein the information has a bit length of 4 bits irrespective of different values of the subcarrier spacing among a plurality of candidate values.

4. A base station comprising:
   a transmitter that transmits master information blocks including an information indicating a configuration of a control resource set; and
   a processor that controls transmission of a downlink control channel, based on the information and a subcarrier spacing applied to transmission of a synchronization signal (SS) block,
   wherein the information has a bit length of 4 bits irrespective of different values of the subcarrier spacing among a plurality of candidate values.

5. A system comprising a base station and a terminal, wherein
   the base station comprises:
     a transmitter that transmits master information blocks including an information indicating a configuration of a control resource set; and
     a processor of the base station that controls transmission of a downlink control channel, based on the information and a subcarrier spacing applied to transmission of a synchronization signal (SS) block, and
   the terminal comprises:
     a receiver that receives the master information blocks; and
     a processor of the terminal that controls reception of the downlink control channel, based on the information and the subcarrier spacing,
   wherein the information has a bit length of 4 bits irrespective of different values of the subcarrier spacing among a plurality of candidate values.

* * * * *